(12) United States Patent  
Highgate

(10) Patent No.: US 8,329,767 B2  
(45) Date of Patent: Dec. 11, 2012

(54) MEMBRANE PRODUCTION

(75) Inventor: Donald James Highgate, Surrey (GB)

(73) Assignee: ITM Power (Research) Ltd., Essex (GB)

( * ) Notice: Subject to any disclaimer, the term of this patent is extended or adjusted under 35 U.S.C. 154(b) by 448 days.

(21) Appl. No.: 12/525,885

(22) PCT Filed: Apr. 3, 2008

(86) PCT No.: PCT/GB2008/001187  
§ 371 (c)(1),  
(2), (4) Date: Oct. 22, 2009

(87) PCT Pub. No.: WO2008/122777  
PCT Pub. Date: Oct. 16, 2008

(65) Prior Publication Data  
US 2010/0056650 A1    Mar. 4, 2010

(30) Foreign Application Priority Data

Apr. 4, 2007    (GB) .................................... 0706634.3

(51) Int. Cl.  
*C08J 5/20* (2006.01)

(52) U.S. Cl. ............... 521/27; 429/30; 429/41; 429/450

(58) Field of Classification Search .................... 521/27; 429/450, 30, 41  
See application file for complete search history.

(56) References Cited

U.S. PATENT DOCUMENTS 4,298,698 A    11/1981    Kawase et al.  
6,624,205 B2 *    9/2003    Muranaka ....................... 521/25

FOREIGN PATENT DOCUMENTS

| GB | 2 380 055 A | | 3/2003 |
|---|---|---|---|
| GB | 2380055 A | * | 3/2003 |
| WO | WO 2005/124893 A2 | | 12/2005 |
| WO | WO-2005/124893 A2 | * | 12/2005 |
| WO | WO 2006/135966 A1 | | 12/2006 |
| WO | WO-2006/135966 A1 | * | 12/2006 |
| WO | WO-2008/122777 A1 | * | 10/2008 |

* cited by examiner

*Primary Examiner* — Peter D. Mulcahy  
*Assistant Examiner* — Henry Hu  
(74) *Attorney, Agent, or Firm* — Saliwanchik, Lloyd & Eisenschenk

(57) ABSTRACT

The present invention is a method for forming a hydrophilic polymer membrane for use in a membrane electrode assembly, comprising the polymerization of a material or materials from which the membrane may be formed, wherein the polymerization is by UV curing.

7 Claims, 1 Drawing Sheet

Blinding Pattern A

Blinding Pattern B

No Blinding

☐ Non-ionic mesh  
■ Acid Zones  
▨ Alkali Zones

Resulting Membrane

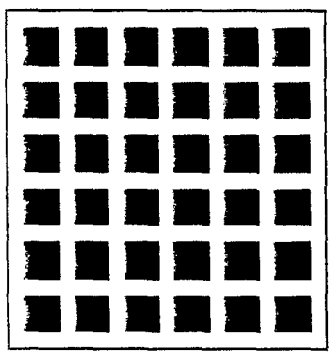
Blinding Pattern A
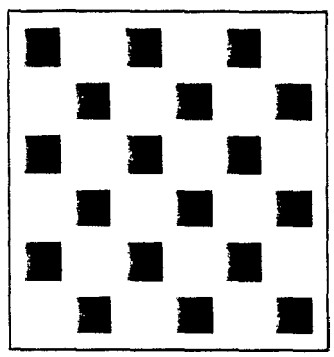
Blinding Pattern B
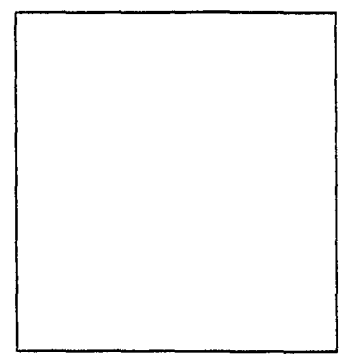
No Blinding
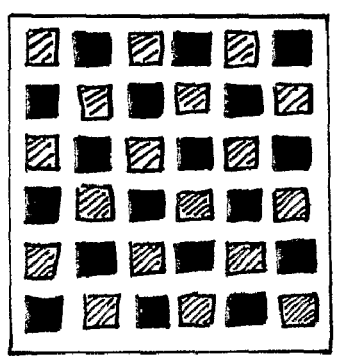
Resulting Membrane
☐ Non-ionic mesh
■ Acid Zones
▨ Alkali Zones

MEMBRANE PRODUCTION

This application is a National Stage Application of International Application Number PCT/GB2008/001187, filed Apr. 3, 2008; which claims priority to Great Britain Application No. 0706634.3, filed Apr. 4, 2007, which are incorporated herein by reference in their entirety.

FIELD OF THE INVENTION

This invention relates to methods for preparing membranes and membrane electrode assemblies (MEAs) for electrochemical cells.

BACKGROUND OF THE INVENTION

WO03/023890 describes hydrophilic polymers and their use in electrochemical cells. The hydrophilic polymers disclosed therein are obtainable by copolymerisation of hydrophobic and hydrophilic monomers that give a hydrophilic polymer a polymerisation. That publication also discloses the formation of membrane electrode assemblies in situ. WO2005/124893 and WO2007/105004 disclose composite membranes for use in electrochemical cells. Such materials have been produced by polymerising liquid monomers via gamma or thermal means.

SUMMARY OF THE INVENTION

The present invention is based on the finding that hydrophilic polymers and materials of the type described in the above patent references may be produced by polymerisation using UV irradiation. The materials that are produced may display improved mechanical properties and performance. Additionally, because polymerisation by UV curing is considerably faster than by gamma or thermal means, chemical mixtures which would phase-separate during polymerisation in a conventional process can be formed into a solid membrane.

According to a first aspect, the present invention is a method for forming a hydrophilic polymer membrane for use in a membrane electrode assembly, comprising the polymerisation of a material or materials from which the membrane may be formed, wherein the polymerisation is by UV curing.

This invention offers an improved method of production for standard one-type hydrophilic ionic exchange membranes and improved production methods for composite membranes, by using UV irradiation.

BRIEF DESCRIPTION OF THE DRAWINGS

FIG. 1 illustrates a preferred embodiment of the invention. FIG. 1 is a schematic diagram showing the formation of a composite membrane, as described in Example 3.

DESCRIPTION OF PREFERRED EMBODIMENTS

As used herein, the term "membrane electrode assembly" (MEA) is a system comprising an ion exchange membrane and electrodes, suitable for use in an electrochemical cell. In the present invention, the ion exchange membrane is a hydrophilic polymer membrane.

The material or materials from which the membrane may be formed will be known to those of ordinary skill in the art and will depend upon the composition of the hydrophilic polymer membrane.

In a preferred embodiment, the hydrophilic polymer is obtainable by the copolymerisation of hydrophobic and hydrophilic monomers that give a hydrophilic polymer on polymerisation, wherein the copolymerisation is conducted in the presence of water and a monomer including a strongly ionic group.

Hydrophobic monomers suitable for use in the invention are: methyl methacrylate (MMA), acrylonitrile (AN), methacryloxypropyltris (trimethylsiloxy)silane (TRIS) and 2,2,2-trifluoroethyl methacrylate (TRIF).

Hydrophilic monomers suitable for use in the invention are: methacrylic acid (MA), 2-hydroxyethyl methacrylate (HEMA), ethyl acrylate (EA), 1-vinyl-2-pyrrolidinone (VP), propenoic acid 2-methyl ester (PAM), monomethacryloyloxyethyl phthalate (EMP) and ammonium sulphatoethyl methacrylate (SEM).

Monomers containing a strongly ionic group, suitable for use in the invention are: 2-acrylamido-2-methyl-1-propanesulphonic acid (AMPSA), vinylsulphonic acid (VSA), styrenesulphonic acid (SSA), 2-sulphoethyl methacrylate (SOMA) and 3-sulphopropyl methacrylate, Na salt (SPM).

Further examples of materials suitable for use in the invention are disclosed in WO03/023890, the contents of which are incorporated herein by reference.

The materials from which the membrane may be formed may include a UV initiator. Examples of such initiators are:

UV1=Darocur 1173=2-Hydroxy-2-methyl-1-phenyl-propan-1-one

UV2=Darocur TPO=2,4,6-Trimethylbenzoyl-diphenyl-phosphine oxide

UV3=Genocure CPK=1-Hydroxycyclohexylphenylketone

UV5=Genocure EPD=Ethyl 4-dimethylaminobenzoate

UV6=Genocure ITX=Isopropylthioxanthone

UV7=Genocure MBB=Methyl o-benzoylbenzoate

UV8=Irgacure 184=1-hydroxycyclohexyl phenyl ketone

UV9=Irgacure 651=2,2-dimethoxy-1,2-diphenylethan-1-one.

In one embodiment, the membrane comprises means for controlling the flow of ions across the membrane. This may be in the form of an electrically-conductive grid, coated with an ionically or electrically resistant material. Preferably the membrane comprises at least two layers of ionic material, for example, one layer of an anionic exchange (AE) material, and one layer of a cationic exchange (CE) material. The membrane may also include an ionically inactive material for the transmission of water. Further examples of composite membranes are given in WO2005/124893, the content of which is incorporated herein by reference.

In another embodiment, at least one property of the membrane is graduated across its thickness. One such property is water content. Further examples are given in WO2007/105004, the content of which is incorporated herein by reference.

The membrane may be a flat sheet, or a stack of flat sheets. It may also be shaped like a grid, i.e. it may be a "waffle" shape.

UV irradiation has a maximum penetrating depth of only a few millimeters. Therefore, UV could be used to cure the active membrane (which is often thinner than 3 mm), while gamma or thermal irradiation could be used to cure any other polymer areas, such as the manifolds or the body of the stack. For complex structures, more than one UV bulb may be used, and each bulb may be made to rotate where necessary.

UV irradiation can cure a membrane through a covering of mesh electrode. The mesh may be coated in catalyst. This may allow for the formation of an MEA in situ. This process is described in WO03/023890.

In a preferred embodiment, composite membranes may be cured in "zones". This may be useful for forming an interpenetrated network (IPN) joint, as described in WO2007/000593, the content of which is incorporated herein by reference. In one embodiment, a non-ionic non-conductive frame is selected. This may comprise Trogamid CX or Trogamid T. A non-ionic monomer may be allowed to penetrate into the frame and may be polymerised by UV curing. An ionomer may then be polymerised (by UV) into the non-ionic polymer, resulting in the formation of an IPN.

In one embodiment of the invention, the components to be polymerised are poured into a UV-transmitting mould. This may be a polythene bag, which is sealed to prevent gas production during polymerisation. The filled mould is then placed under a UV source and polymerised for a predefined time and at a suitable wavelength, as will be apparent to one of ordinary skill in the art. The time will depend on factors such as material used, membrane thickness, UV intensity, distance between the membrane and UV source, and temperature.

Polymerisation will occur only in areas which are subjected to UV irradiation. Thus, a composite membrane can be produced by blinding the face subjected to irradiation in any desired pattern, polymerising and washing away the un-polymerised materials; the addition of another mixture can fill the gaps left by the blinded area, and polymerising is then conducted for a second time without blinding. Blinding can be done by placing a non UV-transmitting material, such as black-out paint or stickers, in the areas that are not to be polymerised. This process can be repeated a number of times, depending on the number of different materials required in the final membrane. Additionally, layers may be built up by repeated curing of monomer mixture layers, to form a planar composite membrane, as described in WO2005/124893. A control grid may be placed between membrane layers during manufacture.

In a preferred embodiment, the membrane has both anionic and cationic zones. Channeling the flow of a gas across AE and CE zones in turn can result in gases remaining within preferred humidity levels. The production of an AE/CE planar composite membrane is described in Example 4.

In a preferred embodiment, the materials or materials from which the membrane may be formed are introduced between electrodes and polymerised in situ.

The following Examples illustrate the invention.

Example 1

Formation of an Acidic Homogeneous Membrane

An acidic mixture was made, as described in WO03/023890, containing:
30 g AMPSA
30 g HPLC Water
2 g Allyl methacrylate
75 g Acrylonitirle
75 g vinylpyrrolidone This mixture can be stored in the freezer prior to use, or used immediately after making it. Prior to polymerisation, the mixture was stirred gently and 3 g of 2-Hydroxy-2-methyl-1-phenyl-propan-1-one was added as the UV initiator.

From this point forward procedures were conducted in low lighting. A membrane was produced by pouring 7 g of the mixture into a 10 cm×10 cm polyethylene bag (750 gauge), removing any bubbles and sealing the bag closed with a heat sealer. The filled bag was then placed under a layer of glass which was pressed onto the membrane to provide some pressure in the monomers; this may reduce any gas formation during polymerisation. The pressed membrane was then placed under the UV source (Dymax PC2000 400 W lamp, with a metal halide bulb). The lamp was placed 19 cm away from the membrane.

When the membrane was in place the lamp was switched on for 5 minutes. The membrane was then removed from the UV source, allowed to cool for a minute and then removed from the polythene bag (mould). The membrane was then hydrated in water and its conductivity tested. The conductivity was 50% higher than achieved by a thermally produced membrane from the same acidic mixture.

Example 2

Formation of an Acidic Membrane with Non-Ionic Hydrophilic Regions

This membrane was prepared in two stages. The same acidic mixture as the previous example was used to prepare the ionic regions, and an AN:VP mixture was used to prepare the non-ionic regions.

A membrane was produced by pouring 7 g of the ionic mixture into a 10 cm×10 cm polyethylene bag (750 gauge), removing any bubbles and sealing the bag with a heat sealer. The bag was then blinded, using parallel stickers, in areas to provide zones which would not polymerise when the membrane was exposed to uv irradiation. The filled bag was then placed under a layer of glass which was pressed onto the membrane to provide some pressure in the monomers, again eliminating gas formation during polymerisation. The pressurised membrane was then placed under the uv source (Dymax PC2000 400 W lamp, with a metal halide bulb). The lamp was placed 19 cm away from the membrane.

When the membrane was in place, the lamp was switched on for 3.5 minutes. The membrane was then removed from under the UV source and removed from the polythene bag (mould). The non-polymerised regions (shielded by the stickers) were wiped away, leaving a mesh of solid polymerised ionic material. This mesh was then placed into a fresh polythene bag and 1.5 g of the non-ionic mixture was added. The non-ionic mixture was designed to have the same expansion characteristics on hydration as the ionic component of the membrane.

Excess monomer liquid and air bubbles were removed prior to sealing the bag. The bagged membrane was then placed under glass, pressed and subjected to UV irradiation for a further 5 minutes. After polymerisation, the membrane was removed from the bag and hydrated in water. The resultant membrane had increased hydration control capabilities since the nonionic regions allowed the transport of water across the fuel cell, without the interference of electro-osmotic drag.

Example 3

Formation of an Acidic and Alkaline Composite Membrane with Separating Non-Ionic Regions Three polythene bags were prepared, respectively having blinding pattern A, blinding pattern B and no blinding. These blinding patterns are shown in FIG. 1.

A non-ionic mesh was created by placing a non-ionic mixture into a bag with blinding pattern A. Air bubbles were removed and the bag was sealed and placed under glass. The mixture was then polymerised for 3.5 minutes using a UV source (Dymax PC200 400 W lamp, with a metal halide bulb, placed 19 cm from the membrane) and then removed from the bag and allowed to cool for one minute. The non-polymerised sections were then washed away.

The non-ionic mesh was placed in a bag with blinding pattern B. An acidic mixture was also added to this bag and polymerised as described above.

The resultant non-ionic mesh/acidic polymer mixture was placed in a bag with no blinding. An alkaline mixture was also added and polymerised as above.

After polymerisation, the membrane was removed from the bag and hydrated in water. The resultant membrane was shown to have increased hydration control capabilities, as the alkaline and acidic regions have opposite directions for electro-osmotic drag, resulting in gases becoming hydrated and dried as they passes over the different zones. Channeling the gas flow across AE (alkaline) then CE (acidic) zones in turn would result in gases remaining within the preferred humidity levels.

Example 4

Formation of a Planar Composite Membrane Having Both Acidic and Alkaline Layers

This membrane was prepared in two stages. An acidic mixture was used to prepare the first layer and then an alkaline mixture was used to prepare the second layer.

A membrane was produced by pouring 8 ml of an acidic mixture into a 10 cm×20 cm bag made from 0.2 mm thick UHMWPE then excluding any air and sealing the liquid in using a heat seal. This was fixed under a glass plate with 0.6 mm shims defining the membrane thickness and the excess liquid being kept under pressure by the use of a second plate covering the excess. The membrane was then placed under the UV source (UVITRON Intelliray400 lamp, 400 W, with a metal halide bulb). The lamp was fixed at a height of 29 cm and was switched on for 200 seconds.

The UHMWPE was removed from one side of the cured membrane and a fresh sheet of UHMWPE was sealed over the top to make a bag with the acidic membrane fixed on one side of it. 25 ml of an alkaline mixture was poured into the bag and sealed closed using a heat seal after any bubbles has been removed. The membrane was fixed under a glass plate with 0.7 mm shims defining the thickness. A second plate was fixed over the excess liquid to keep it under pressure. The membrane was placed under the UV source for 1000 seconds. After polymerisation, the membrane was removed from the bag and hydrated in water.

In all cases UV curing offers significant advantages, both in the speed of production, and the ease in which a complex membrane can be produced. Many mixtures have improved mechanical and ionic properties when cured by this method.

The invention claimed is:

1. A method for forming a hydrophilic polymer membrane for use in a membrane electrode assembly, comprising the polymerisation of a material or materials from which the membrane is formed, wherein the polymerisation is by UV curing, wherein the material or materials from which the membrane is formed are introduced between electrodes and polymerised in situ, and wherein the membrane comprises at least two layers of ionic material.

2. The method according to claim 1, wherein the membrane is obtained by the copolymerisation of hydrophobic and hydrophilic monomers that give a hydrophilic polymer on polymerisation, and wherein the copolymerisation is conducted in the presence of water and a monomer including a strongly ionic group.

3. The method according to claim 1, wherein the water content of the membrane is graduated across its thickness.

4. The method according to claim 1, wherein the membrane comprises an anionic exchange material, a cationic exchange material and an ionically inactive material.

5. The method according to claim 1, wherein the material or materials from which the membrane is formed include a UV initiator.

6. The method according to claim 1, wherein the membrane is a flat sheet, or a stack of flat sheets.

7. The method according to claim 1, wherein the membrane is in a grid pattern.

* * * * *